Patented Aug. 5, 1947

2,425,192

UNITED STATES PATENT OFFICE 2,425,192

POLYMERIZATION OF VINYL ACETATE ALONE OR IN MIXTURES, AND PRODUCTS THEREOF

Edward L. Kropa, Fairfield, Conn., assignor to American Cyanamid Company, New York, N. Y., a corporation of Maine No Drawing. Application July 13, 1944, Serial No. 544,827

3 Claims. (Cl. 260—84)

This invention relates to the production of thermoplastic polymeric materials.

The use of polymers of various unsaturated substances has previously been somewhat limited because suitable solvents for many such substances and the polymers thereof have not been known. One of these, polyacrylonitrile, is insoluble in most of the known solvents. Accordingly, this material, as well as many of the other polymeric materials produced from unsaturated compounds, has not attained any substantial commercial utilization in the production of artificial fibers, films, etc.

Previously polymerization of unsaturated compounds has been carried out in a variety of organic solvents. In certain instances aqueous emulsions have been employed. In both instances, solutions or suspensions have been formed.

An object of this invention is to provide a solvent material and to so polymerize various unsaturated materials such as acrylonitrile, that concentrated solutions of the polymeric material thus produced may be obtained.

Another object of this invention is to produce solutions of polymeric materials suitable for the production of artificial fibers, films, etc.

Still another object of this invention is to polymerize unsaturated materials in salt solution from which the polymer may be precipitated.

These and other objects are attained by polymerizing in an aqueous solution of a zinc salt which is extremely water-soluble, a substance of the following general formula:

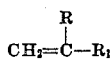

and isomers thereof, where R is hydrogen or methyl, where $R_1$ may be —CN or

where $R_2$ is hydrogen, alkyl, alkaryl, cycloalkyl, of

and where $R_3$ and $R_4$ are hydrogen or organic radicals. Zinc salts suitable for the purposes of this invention are those, a unit of weight of which will dissolve in less than 0.3 of a unit weight of cold water.

The following examples in which the proportions are in parts by weight are given by way of illustration and not in limitation.

Example 1

| | Parts |
|---|---|
| Zinc chloride | 72 |
| Water | 18 |
| Acrylonitrile | 10 |
| Benzoyl peroxide | 0.002 |

To a solution of the zinc chloride in the water, the acrylonitrile with the benzoyl peroxide dissolved therein is added. This composition is heated at about 90° C. for 4–5 hours during which time the solution changes to a thick viscous mass. This viscous mass is poured into a relatively large volume of water, thereby precipitating a polymeric powder. This powder may be separated by filtration, washed with water and dried. This dried material may be subjected to heat and pressure to produce molded articles having excellent chemical resistance and also being very resistant to heat. The dried powder may also be sheeted on hot mill rolls (e. g. 150° C.) to yield tough clear films.

The filtrate which contains the zinc chloride may be concentrated in any suitable apparatus by heating at about 100° C. for sufficient time to volatilize enough water so that the concentrate is again suitable for re-use in polymerizing another batch of acrylonitrile or other polymerizable material.

Example 2

| | Parts |
|---|---|
| Acrylonitrile | 8 |
| Zinc chloride | 74 |
| Water | 18 |

The acrylonitrile is mixed with a solution of the zinc chloride in the water. This solution becomes slightly warm during mixing. It is heated for about 5 hours at 90° C. and then aged for about 2 weeks at room temperature to increase the viscosity thereof.

The solution may be extruded through a nozzle or spinneret whose internal diameter is approximately 0.1 millimeter. The material is preferably extruded into warm water (70–80° C.) under a pressure of about 35–40 pounds per square inch. Under these conditions a fiber is formed and coagulated which may be drawn at approximately 40 feet per minute. Utilizing somewhat lower temperatures, i. e., 67° C. and a pressure of about 170 pounds per square inch a fiber is formed which may be drawn at about 30 feet per minute.

In order to increase the strength of the fibers produced it is desirable that they be drawn in such a manner that they will be stretched to a substantial extent. This may be conveniently done in the coagulating bath. The stretching tends to increase the strength of the fibers as compared to those which are merely extruded. Somewhat better results are obtained by allowing the fiber to contract and then subjecting it to another stretching operation.

Example 3

| | Parts |
|---|---|
| A 75% solution of zinc chloride in water | 54 |
| Acrylonitrile | 25 |
| Benzoyl peroxide | 0.1 |

The acrylonitrile is dissolved in the zinc chloride solution and the mixture becomes very warm, thereby indicating the possibility of a chemical reaction between the monomeric acrylonitrile and the zinc chloride. The benzoyl peroxide is added and the mixture is heated for about ½ hour at 90–95° C. A rubbery gel is obtained. This gel may be washed with hot water until substantially free of zinc chloride solution. The resulting composition, which resembles crepe rubber when hot, may be milled on hot rolls at about 150–160° C. to produce extremely tough transparent films.

Example 4

| | Parts |
|---|---|
| Methacrolein | 25 |
| A 75% solution of zinc chloride in water | 25 |

The methacrolein is dissolved in the zinc chloride solution and a few drops of t-butyl peroxide are added. A solid somewhat opaque gel is obtained after about 12 hours at room temperature. This may be oxidized to produce a water-soluble polymer.

Example 5

| | Parts |
|---|---|
| Methacrolein | 7 |
| Acrylonitrile | 7 |
| A 75% solution of zinc chloride in water | 12 |

The methacrolein and acrylonitrile are dissolved in the zinc chloride solution and a few drops of t-butyl peroxide are added. Upon standing at room temperature for about 12 hours, a clear yellow viscous material is obtained which may be molded or extruded in the same general manner as described in Examples 1 and 2, respectively.

Example 6

| | Parts |
|---|---|
| Methyl acrylate | 5 |
| An 80% solution of zinc chloride in water | 10 |

The methyl acrylate is dissolved in the zinc chloride solution and a few milligrams of benzoyl peroxide are added thereto. The mixture is then exposed to a source of ultra-violet light such as a mercury arc for about 2–3 hours. Optionally heat may be applied in the same general manner as described in the preceding examples in addition to, or instead of, ultra-violet radiation. The methyl acrylate polymerizes during this time and the product may be utilized in the same general manner as described in Examples 1 and 2.

Example 7

| | Parts |
|---|---|
| Vinyl acetate | 5 |
| An 80% solution of zinc chloride in water | 10 |

The vinyl acetate is dissolved in the zinc chloride solution and a few milligrams of benzoyl peroxide are added thereto. The mixture is then exposed to a source of ultra-violet light such as a mercury arc for about 2–3 hours. The vinyl acetate polymerizes during this time and the product may be utilized in the same general manner as described in Examples 1 and 2.

Example 8

| | Parts |
|---|---|
| Vinyl acetate | 25 |
| An 80% solution of zinc chloride in water | 100 |

The vinyl acetate is dissolved in the zinc chloride solution and a few milligrams of benzoyl peroxide are added thereto. The mixture is then exposed to a source of ultra-violet light such as a mercury arc for about 2–3 hours. The vinyl acetate polymerizes during this time and the product may be utilized in the same general manner as described in Examples 1 and 2.

Example 9

| | Parts |
|---|---|
| Methyl methacrylate | 5 |
| An 80% solution of zinc chloride in water | 10 |

The methyl methacrylate is dissolved in the zinc chloride solution and a few milligrams of benzoyl peroxide are added thereto, thereby forming a slightly pink solution. The mixture is then exposed to a sourse of ultra-violet light such as a mercury arc for about 2–3 hours. The methyl methacrylate polymerizes during this time and the product may be utilized in the same general manner as described in Examples 1 and 2.

Example 10

| | Parts |
|---|---|
| Methyl itaconate | 5 |
| An 80% solution of zinc chloride in water | 10 |

The methyl itaconate is dissolved in the zinc chloride solution and a few milligrams of benzoyl peroxide are added thereto. The mixture is then exposed to a source of ultra-violet light such as a mercury arc for about 5–8 hours. The methyl itaconate polymerizes during this time and the product may be utilized in the same general manner as described in Examples 1 and 2.

Example 11

| | Parts |
|---|---|
| Acrylonitrile | 10 |
| An 80% solution of zinc chloride in water | 90 |

The acrylonitrile is dissolved in the zinc chloride solution and is polymerized by heating in the presence of a small proportion of benzoyl peroxide at about 90° C. for about an hour. A small proportion of a water-dispersible dye, e. g., Calco Brilliant Pigment Blue BN, is dispersed in the solution containing the polymerized acrylonitrile. The resulting composition is applied to cloth in the same general manner as in textile printing. The cloth is then immersed in water, thereby precipitating the resin and the color material. The treated cloth shows no leaching of the color material upon washing with soap and hot water.

Example 12

| | Parts |
|---|---|
| 25% ethyl acrylate-75% acrylonitrile mixture | 14 |
| A 75% solution of zinc chloride in water | 86 |
| Benzoyl peroxide | 0.1 |

The mixture of ethyl acrylate and acrylonitrile is dissolved in the solution of zinc chloride and the benzoyl peroxide is added. The resulting solution is heated at about 90–100° C. for ½–2 hours thereby causing the ethyl acrylate and acrylonitrile to polymerize. The resulting polymer may be recovered and employed in molding as in Example 1 or the solution may be extruded as in Example 2.

Methyl acrylate, propyl acrylate, n-butyl acrylate, etc., may be substituted for part or all of the ethyl acrylate employed in Example 12 in order to obtain products having different physical properties. In some cases it may be desirable to employ a mixture of several acrylates with acrylonitrile such as a mixture containing 5% each of methyl, ethyl, n-propyl and n-butyl acrylates and 80% of acrylonitrile. The total proportion of the esters of acrylic acid should be at least 5% based upon the total weight of the polymerizable substances employed.

Methyl methacrylate may be substituted in whole or in part for the ethyl acrylate employed in Example 12 and the former may be replaced in part with other methacrylates such as ethyl methacrylate, n-propyl methacrylate, n-butyl methacrylate. Furthermore, the methacrylates may be employed along with methyl, n-propyl and n-butyl acrylates, as well as other such compounds. Such compositions may contain, for example, about 75% acrylonitrile, 5% methyl methacrylate, 5% ethyl methacrylate, 5% n-propyl methacrylate, 5% butyl methacrylate and 5% of any one of the esters of acrylic acid mentioned in the preceding paragraph.

Among the substances which may be polymerized in the same general manner as described herein are: methacrylonitrile, ethyl acrylate, n-propyl acrylate, isopropyl acrylate, butyl acrylate, isobutyl acrylate, ethyl methacrylate, propyl methacrylate, butyl methacrylate, cyclohexyl methacrylate, allyl acetate, methallyl acetate, methacrylamide, methyl vinyl ketone, etc. Obviously, various mixtures of these substances or mixtures of these substances with any of those described in the above examples may be used in the same general manner as the individual substances.

Vinyl acetate may be polymerized in mixtures including any of the unsaturated substances disclosed herein as suitable for polymerization. In such mixtures the vinyl acetate should be present in proportions of at least 5% based on the total weight of the polymerizable substances in said mixture. A specific example of a mixture of this type would be one containing 75% of acrylonitrile and 25% of vinyl acetate.

In some instances it may be desirable to copolymerize two or more unsaturated materials of the type described above or one of the type described above with some other reactive polymerizable material. For certain purposes it may be advantageous to use a substance containing an amide group, e. g., acrylamide, in order to incorporate in the polymer groups having an affinity for acidic dyes. Similarly, acrylic acid might be used in the co-polymer thereby giving it an affinity for basic dyes.

Among the zinc salts which are suitable for the solvent medium the following are preferred: zinc chloride, zinc bromide, and zinc iodide. Mixtures of these are also useful. It is necessary that the solution of the zinc salts be highly concentrated for the purposes of this invention. Accordingly, the solutions should contain at least 65% of the zinc salt.

Other salts may be added after polymerization, e. g., sodium chloride, aluminum chloride, magnesium chloride, etc., in order to aid the coagulation. Various polymerizing catalysts may be substituted for all or part of the benzoyl peroxide or t-butyl peroxide, e. g., lauroyl peroxide or cocoanut oil peroxide, stearyl peroxide, aluminum chloride, etc. A polymerization catalyst is not necessary since the zinc salt acts as a catalyst itself although the reaction goes much more slowly and therefore it is generally desirable to use polymerization catalysts as indicated in the above examples.

It is to be noted that concentrated aqueous solutions of many substances which will dissolve the polymerizable materials inhibit polymerization and therefore are not suitable for use according to this invention. Examples of such substances are sodium thiocyanate, potassium thiocyanate, zinc thiocyanate, etc. These substances are such active polymerization inhibitors that in some instances they are especially useful in stabilizing substances such as acrylonitrile against polymerization. Small amounts of some of these materials, e. g., sodium thiocyanate and potassium thiocyanate, may be incorporated into potentially polymerizable materials in order to stabilize them over relatively long periods of time. These substances are particularly suitable since they may be easily separated from the polymerizable material merely by distillation leaving the salt used as a residue.

Fillers and/or pigments may be mixed with the polymeric products to produce molding compositions. Examples of these are: wood flour, wood fiber, paper dust, clay, zein, glass wool, foliated glass, mica, granite dust, silk flock, cotton flock, steel wool, silicon carbide, paper, cloth, sand, titanium oxide, lithopone, lead oxide, chrome yellow, lead cyanamide, zinc cyanamide, etc.

Polymeric materials made according to my invention have a wide variety of applications. The solutions produced according to the above description may be extruded to form filaments, films, ribbons, or tubes. They may be used in the manufacture of woven fabrics, gaskets, electrical insulation, heat insulation, etc. The polymeric materials may be molded to form gaskets, packing glands, electrical insulators, novelties, etc. The polyacrylonitrile materials are particularly suitable for such purposes wherein it is desirable to have materials which are resistant to grease, organic solvents, water, heat, etc.

This application is a continuation-in-part of my copending application, Serial No. 331,756, filed April 26, 1940, now Patent No. 2,356,767.

Obviously many modifications and variations may be made in the processes and compositions described above without departing from the spirit and scope of the invention as defined in the appended claims.

I claim:

1. A process which comprises polymerizing vinyl acetate in an at least 65% solution of zinc chloride in water.

2. A process which comprises polymerizing a mixture including acrylonitrile and at least 5% of vinyl acetate in an at least 65% solution of zinc chloride in water.

3. A process which comprises polymerizing vinyl acetate in an at least 65% solution in water of a substance selected from the group consisting of zinc chloride, zinc bromide and zinc iodide.

EDWARD L. KROPA.

REFERENCES CITED

The following references are of record in the file of this patent:

UNITED STATES PATENTS

| Number | Name | Date |
| --- | --- | --- |
| 2,140,921 | Rein | Dec. 20, 1938 |
| 2,356,767 | Kropa | Aug. 29, 1944 |